United States Patent [19]
Nutzel

[11] Patent Number: 5,811,940
[45] Date of Patent: Sep. 22, 1998

[54] PHASE-SHIFT LAMP CONTROL

[75] Inventor: Wolfgang Nutzel, Wolnzach, Germany

[73] Assignee: Physiomed-Medizintechnik GmbH, Schnaittach, Germany

[21] Appl. No.: 769,132

[22] Filed: Dec. 18, 1996

Related U.S. Application Data

[63] Continuation-in-part of PCT/EP95/02439, Jun. 22, 1995.

[30] Foreign Application Priority Data

Jun. 22, 1994 [DE] Germany ............ 44 21 736.6

[51] Int. Cl.$^6$ ............................... H05B 37/02
[52] U.S. Cl. ................... 315/291; 315/293; 315/295; 315/312; 315/316
[58] Field of Search .................... 315/295, 293, 315/291, 307, DIG. 4, 316, 119, 308, 312, 292

[56] References Cited

U.S. PATENT DOCUMENTS

| | | | |
|---|---|---|---|
| 5,239,234 | 8/1993 | Pischke et al. ............... | 315/119 |
| 5,381,078 | 1/1995 | Szuba ............................ | 315/316 |
| 5,428,265 | 6/1995 | Booth et al. .................. | 315/158 |
| 5,430,356 | 7/1995 | Ference et al. ............... | 315/291 |

FOREIGN PATENT DOCUMENTS

| | | |
|---|---|---|
| 0 046 395 | 2/1982 | European Pat. Off. . |
| 0 078 790 | 5/1983 | European Pat. Off. . |
| 0 413 991 | 2/1991 | European Pat. Off. . |
| 0 471 332 | 2/1992 | European Pat. Off. . |
| 27 02 490 | 7/1978 | Germany . |
| 30 09 725 | 9/1981 | Germany . |

*Primary Examiner*—Robert J. Pascal
*Assistant Examiner*—David H. Vu
*Attorney, Agent, or Firm*—Browdy and Neimark

[57] ABSTRACT

The invention relates to a method for the independent control of individual or a group of fluorescent lamps of a lighting system operated by the a.c. supply system with the main functions of rapid start, brightness control (dimming), extinction and storage of an operating state for switching on the system after it has been switched off. A feature of the invention resides in the possibility of converting existing conventional lighting systems without additional installation costs merely by exchanging the respective conventional starter for a control circuit according to the invention and by exchanging the conventional light switch for transducers according to the invention. To achieve this, a control element instead of the known starter is connected into the heating circuit for a lamp formed from a series circuit of a fluorescent tube with a ballast device. The control element consists at least of the components of power switch, phase detector, power supply, signal processor, clock generation means and control software deposited in the non-volatile memory and generating the control signals of the power switch among other things from the information of the phase detector.

10 Claims, 11 Drawing Sheets

PHASE-SHIFT LAMP CONTROL

CROSS-REFERENCE TO RELATED APPLICATION

The present application is a CIP of PCT/EP95/02439, filed Jun. 22, 1995.

BACKGROUND OF THE INVENTION

1. Filed of the Invention

The invention relates to method of controlling fluorescent lamps of a lighting system operated by the a.c. power supply, wherein each lamp consists of a series circuit comprising an impedance for current limitation with a fluorescent tube with preheatable electrodes and a control element with an electronic power switch comprising an arithmetic and logic unit for the functions of heating and igniting pulse production with isolation of the discharge section

2. Background Art

The main advantages of a lighting system with fluorescent lamps in comparison to incandescent lamps reside in the higher light yield and the longer service life of the tubes. A further advantage of fluorescent tubes over incandescent bulbs resides in the very low inertia of the discharge and in the possibility for free selection of the light colour in wide limits owing to the use of suitable luminous substances so they can be used for lighting systems with rapidly changing light and colour effects, as required, for example, in advertising or for signalling purposes.

However, these advantages can only be used unsatisfactorily in lamp circuits which are conventional nowadays and are formed essentially by an impedance connected in series with the tube and limiting the lamp current and by a conventional commercial starter arranged in the heating circuit, usually a bimetallic glow starter. The high so-called erosion on switching on restricts the operation of lighting systems with fluorescent lamps, which are more economical than incandescent lamps, to applications where no change in the lighting output is required for a prolonged period.

Many attempts have been made on the one hand to optimise the lamp start in the sense of extending the service life of the tubes and on the other hand to expand the sphere of use of fluorescent lamps to applications in which timing of the light output which is flexible within wide limits is demanded of a group of lamps or individual lamps of a lighting system, without the production costs substantially exceeding those of conventional systems.

A circuit arrangement for the ignition and brightness control of fluorescent lamps is known from DE 33 27 189. An electronic switch in the heating circuit of a fluorescent tube connected in series with an inductor is controlled from an adjustable phase shifter such that heating current initially flows through the heating electrodes of the tube during each half wave of the a.c. supply voltage and an inductive voltage pulse corresponding to the preceding heating current leads to ignition and illumination for the remainder of the half wave after opening of the switch.

A drawback of the known arrangement is the dependency of the igniting pulse energy on the heating current flowing at the moment of disconnection. It is not therefore possible to adjust the value of the igniting pulse and the duration of heating independently of one another such that an igniting pulse strength necessary for any desired operating state is produced.

As shown in practice, excessively strong and excessively weak igniting pulses have a number of serious drawbacks.

A controller which also provides an electronic switch in the heating circuit of a fluorescent tube for limiting the lighting phase and the preheating of the electrodes is known from DE 27 02 490. It is proposed therein that a central control device be arranged in a conventional commercial flush-type box and the control circuit for each tube be arranged in a respective housing similar to the dimming starters.

A drawback of this known arrangement resides in the considerable installation costs for a lighting system in which the lamps are to be controlled independently of one another as each lamp has to be connected to its own control line with the control device in addition to the power supply line. Therefore, simple modification of conventional lighting systems is not possible, in particular, with the known arrangement.

SUMMARY OF THE INVENTION

An object of the invention is to provide a method for the independent control of individual or a group of fluorescent lamps in a lighting system operated by the a.c. power supply with the main functions of ignition, brightness control (dimming), extinction and storage of an operating state for switching on again after disconnection of the system. One feature of the object is to be able to convert existing conventional lighting systems without additional installation costs merely by exchanging the conventional starter for a respective control circuit and optionally exchanging the conventional light switch for a transducer. Other features of the object are to allow monitoring of the operability of the individual lamps, disconnection of individual lamps in the case of defects, influencing of lamp operation by connected sensors and a mode of operation which extends the service life of the individual tubes.

This object is achieved with a method according to which the control element additionally has a signal processor, which is preferably provided with the components, digital input unit, non-volatile memory, random access memory, clock generation means and digital output unit, and a phase detector and a power supply unit, wherein the control signals for the power switch for the modes of operation starting and/or dimming and/or extinction and/or feedback are produced by means of a control program deposited in the non-volatile memory and from the phase information of the phase detector, and wherein the control element is arranged in the heating circuit of the fluorescent tube.

A number of advantageous effects emerge:

A multiprocessor arrangement with decentralised parallel processing is formed by the use of a respective signal processor with its own control program for each tube, synchronisation taking place via the mains frequency common to all lamps. The brightness values for each half wave of the a.c. supply voltage can therefore be varied individually in each tube so very complex, rapidly changing light patterns and, if differently coloured tubes are used, also coloured patterns can also be achieved, as demanded, for example, in advertising.

A further advantageous effect of the invention allows the entire control circuit to be incorporated into a conventional starter housing so a lighting system according to the invention does not necessitate additional installation costs in comparison with a conventional system. Furthermore, an existing system can also be converted by exchanging the conventional starters for the control means according to the invention.

To save power, tubes can be disconnected completely even when the operating voltage is applied, so no heating current flows, in contrast to dim operation.

A further advantage of the method according to the invention resides in the possibility of being able to influence the sequence of the control program by equipping the control element with sensors in order thus to adapt the mode of operation to environmental influences or to signal specific environmental conditions.

A further advantage is the feature of being able to influence the control programs in the control elements by remote control, a particularly advantageous feature of the method according to the invention, which proposes information transmission via the supply system, residing in the fact that no additional hardware components are required for receiving this information but merely an additional subroutine in the control software.

Embodiments of the invention are illustrated in the drawings and will be described in detail hereinafter.

DESCRIPTION OF THE PREFERRED EMBODIMENTS

Figure 1:
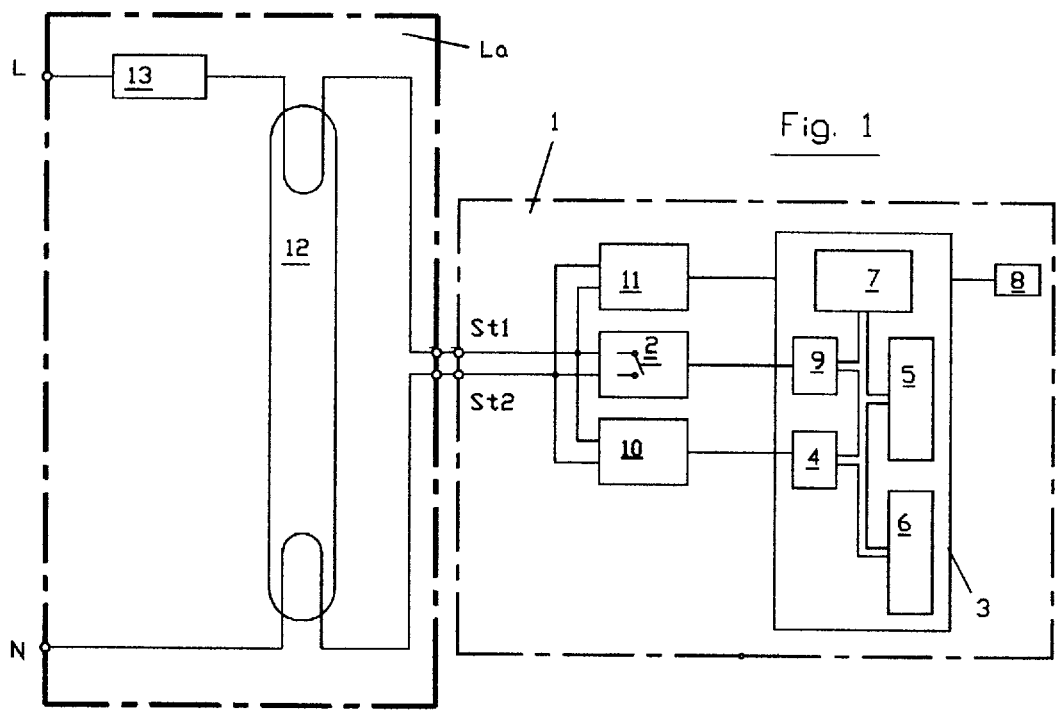
FIG. 1 is a block circuit diagram of a lamp with control element.

As shown in FIG. 1, the lamp La consists of the conventional series circuit of ballast impedance 13 for power limitation and fluorescent tube 12 with preheatable electrodes. The ballast impedance 13 can be an inductor coil or also a series circuit of inductor coil and capacitor, of the type used in the so-called duo circuit for reactive-current compensation. The lamp La is connected in parallel to the other lamps of a lighting system to the a.c. power supply via the terminals N and L.

St1 and St2 designate the two terminals of the conventional starter socket connected parallel to the discharge section of the tube. The conventional glow starter is replaced in the controller according to the invention by the control element 1 preferably having a mechanical construction similar to glow starters. This allows to convert an existing lighting system to a control method according to the invention by exchanging the glow starters for control elements according to the invention.

In its basic design, the control element 1 consists of an electrically controllable power switch 2 which is connected in parallel with the connections St1 and St2 and through which the heating current limited by the ballast impedance 13 flows in its switched on state and which bridges the discharge section between the tube electrodes in a low-resistance manner so the tube voltage is reduced to values far below the operating voltage. The functions of extinction of an existing gas discharge and heating of the lamp electrodes are achieved by switching on the power switch.

The heating current is interrupted and the low-resistance bridging of the discharge section is eliminated by switching off the power switch 2, so on the one hand the energy stored in the inductor coil and dependent on the instantaneous value of the heating current is liberated as a voltage pulse to the tube electrodes and on the other hand a gas discharge current limited by the inductor coil can flow via the lamp electrodes. The functions of igniting pulse generation and isolation of the discharge section are therefore fulfilled by switching off the power switch 2.

The phase detector 10 which can convert the voltage at St1 and St2 into an in-phase rectangular signal with an amplitude suitable for further processing is a further component of the control element 1. The edges of this rectangular voltage therefore signal the passages through zero of the residual voltage applied to the power switch and therefore of the heating current when the power switch 2 is closed. When the power switch is opened and the discharge ignited, the edges correspond to the passages through zero of the lamp current and, when the discharge is not ignited, to the passages through zero of the a.c. supply voltage applied to the lamp.

The signal processor 3 is a further component of the control element 1. It can be a conventional commercial simple microprocessor or also an integrated circuit specific to the customer, at least the functional blocks of arithmetic and logic unit (ALU) 7, non-volatile memory 5, random access memory (RAM) 6, digital input unit 4 and digital output unit 9 being connected via a bus structure in a known arrangement. The non-volatile memory 5 serves for the permanent storage of the control programs and operating parameters. The unit 8 is used to produce the system clock for the signal processor 3.

The power supply unit 11 is a further component of the control element 1.

Figure 2:
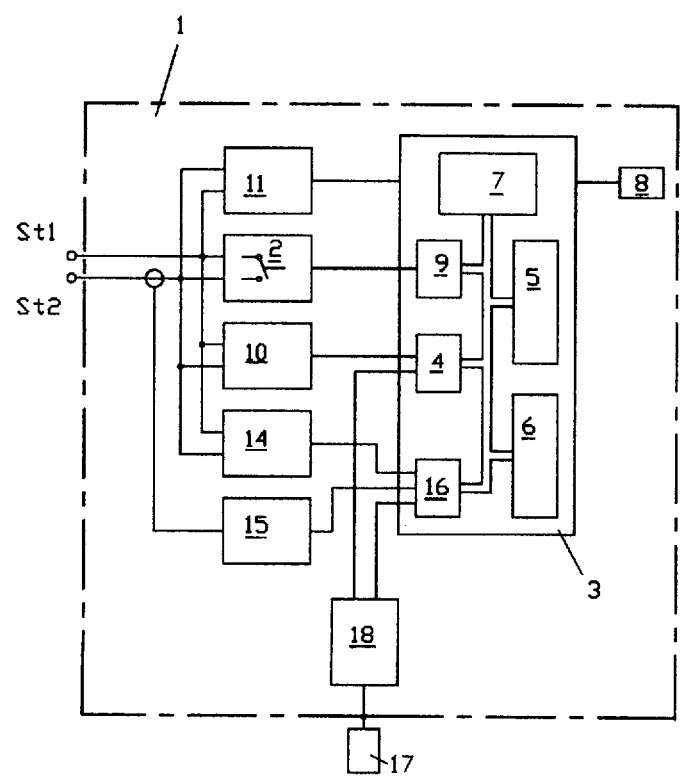
FIG. 2 is a block circuit diagram of a control element for additional functions.

FIG. 2 shows the construction of a control element 1 for additional functions, individual or all additional components being provided according to the requirement of the control programs used.

In addition to the components of the control element according to FIG. 1, an adaptation unit 14 is provided which converts the voltage applied to the connections St1 and St2 such that it can be supplied to an analogue digital converter 16 additionally provided in the signal processor. This allows the control program to monitor the value and timing of the igniting pulse and of the arc voltage at the tube 12 and, when the discharge is extinguished, also of the a.c. supply voltage.

The adaptation unit 15 which converts the current strength flowing through the power switch such that it can be supplied to the analogue digital converter 16 additionally provided in the signal processor forms an additional component. This allows the control program to monitor the value and timing of the heating current through the electrodes of the tube 12.

The adaptation unit 18 forms an additional component. Its object is to convert a signal from a sensor unit 17 connected to it such that it can be supplied to the analogue digital converter 16 and/or the digital input unit 4. This allows the control program to monitor the signals of the sensor unit 17.

Examples of the sensor unit 17 include temperature sensor, light sensor, radiation sensor, sound sensor, movement sensor, gas sensor, and known receiver circuits of the type used for the remote control of devices.

Figure 8:
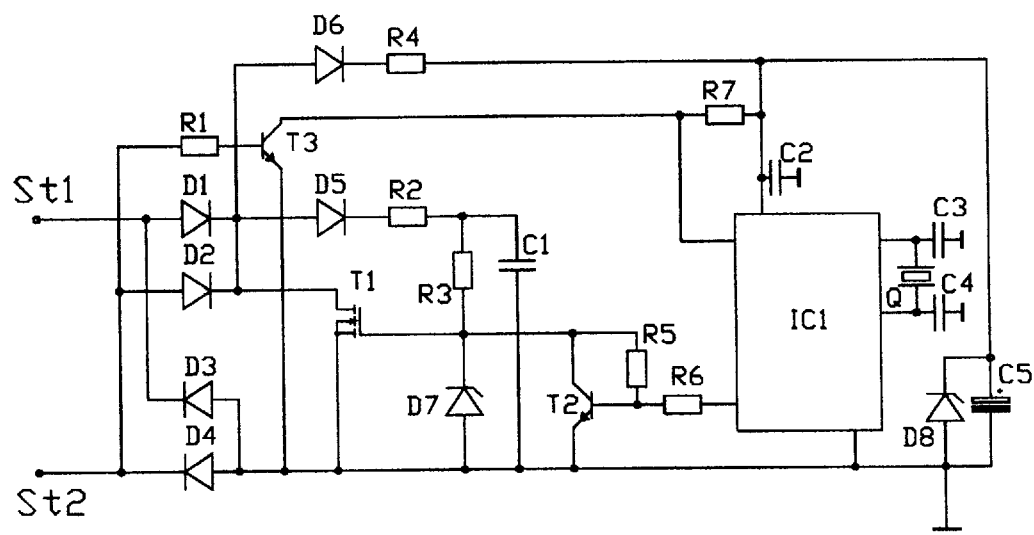
FIG. 8 is a circuit diagram of an embodiment of a control element with a conventional commercial microprocessor as signal processor.

FIG. 8 shows an example of a simple embodiment of a control element for the method according to the invention using a conventional commercial microprocessor Ic1. The diodes D1 to D4 together with the MOS-FET transistor T1 form the a.c. power switch. A Zener diode D7 at the gate of the transistor T1 prevents the gate voltage from rising to unallowably high values. The capacitor C1 which is charged to a high voltage in the blocking state of T1 via the diode D5 and the resistor R2 is provided to cover the gate voltage requirement of T1, which most conventional commercial high voltage MOS-FET transistors require for complete and rapid forced tripping. T1 is in the blocking state when the transistor T2 connected to its gate receives basic current from the Ic1 via R6, thus becomes conductive and therefore draws the gate to approximately zero potential. If the basic current from the Ic1 is switched off, T2 passes into the blocking state so charge from the capacitor C1 flows via the resistor R3 to the gate and therefore switches T1 into the conductive state. The resistor R5 has very high resistance and prevents the switching through of T1 at the moment of application of the operating voltage, while Ic1 is not yet operating properly. The transistor T3 with the resistors R1 and R7 forms the phase detector for the a.c. voltage applied to St1 and St2. The voltage supply unit is very simple in construction owing to the low power consumption of the module Ic1 designed according to C-MOS technology. The capacitor C5 is charged via the diode D6 and the resistor R4 during the blocking phase of T1, its voltage being limited by the Zener diode D8 to the operating voltage permitted for Ic1. Providing that T1 is conducting, D6 prevents the capacitor discharge from flowing from C5. C3 and C5 together with the resonator Q in a known arrangement serve to produce the clock for Ic1.

Figure 9:
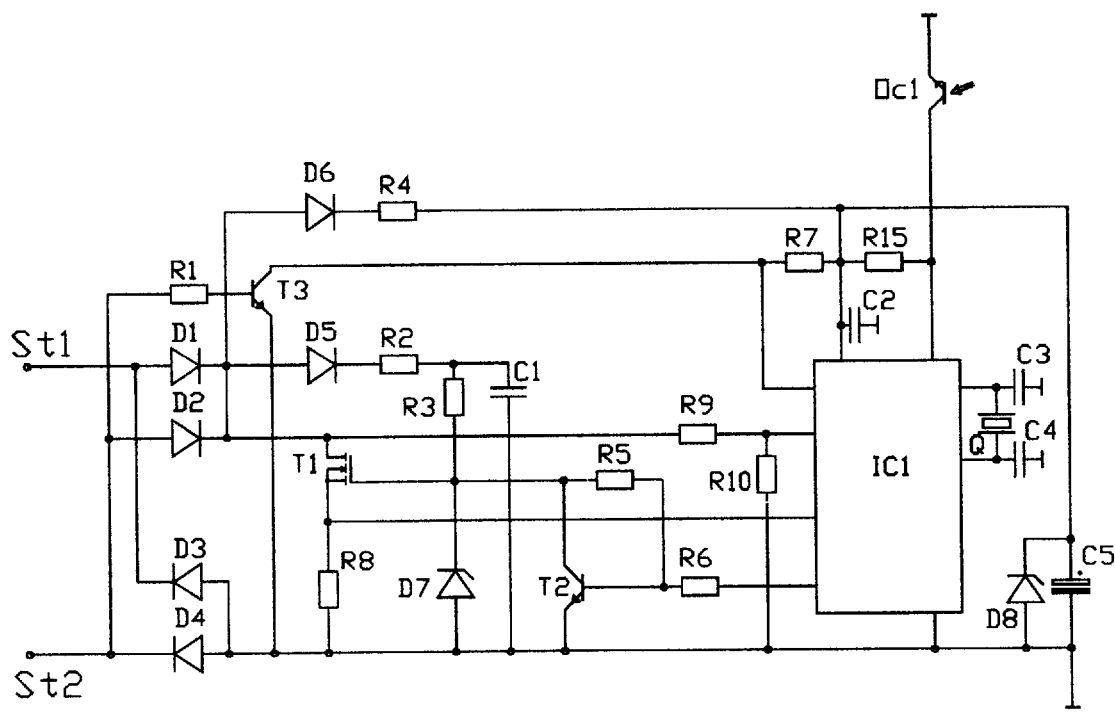
FIG. 9 is a circuit diagram of a control element with additional functions.

FIG. 9 shows an example of an embodiment of a control element for the method according to the invention with additional functions. The resistor R8 located in the main current circuit of the power switch T1 forms a simple adaptation circuit in order to convert the instantaneous value of the current strength flowing through the power switch T1 into a voltage which can be processed by an analogue digital converter integrated in the processor Ic1. Together with the signal of the phase detector as a sign, the trend of the heating current through the electrodes of the fluorescent tube can therefore be detected. In FIG. 9, the resistors R9 and R10 represent an example of a simple adaptation circuit for converting the instantaneous value of the voltage applied to the drain connection of the transistor T1 into a voltage which can be processed by an analogue digital converter integrated in the processor Ic1. Together with the signal of the phase detector as a sign, the voltage trend at the electrodes of the fluorescent tubes can be detected.

In FIG. 9, the optocoupler Oc1 together with the resistor R15 forms a simple example of the connection of a sensor and the adaptation of its output signal to the processor Ic1. In the illustrated example, the sensor can be used for detecting the environmental brightness, the lamp brightness or also for the transmission of information. Other types of sensor can be used accordingly for detecting other values for processing by the control software.

The control software deposited in the non-volatile memory of the signal processor is responsible for functioning of the control element, the subroutines responsible for carrying out the various basic functions of the control element being called up in an appropriate sequence from a main program depending on the intended mode of operation of the lighting system. Examples of functions which can be called up from the main program are shown in the flow charts in FIGS. 3 to 7.

Figure 3:
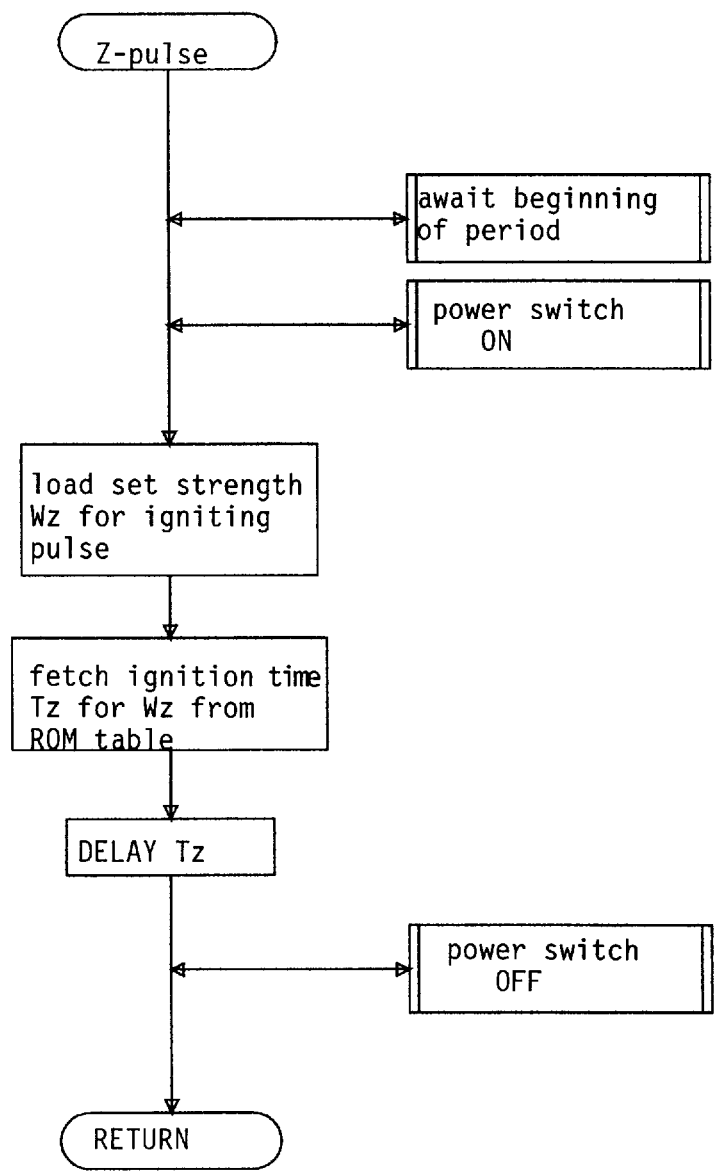
FIG. 3 is a flow chart for igniting pulse generation.

FIG. 3 shows an example of a subroutine for producing an igniting pulse of a variable predetermined set strength Wz. This utilises the fact that the current strength flowing in the inductor coil at the moment of disconnection depends on the moment t which expired after the passage of the current through zero. $i = isp*\sin(2*pi*f*t)$ applies to sinusoidal inductor current with the peak value isp and frequency f. The current flow time Tz during which the power switch must be switched on after the passage of the current through zero in order to produce an igniting pulse of a predetermined set strength Wz by its disconnection can therefore be determined for each lamp output by a table deposited in the ROM.

Figure 4:
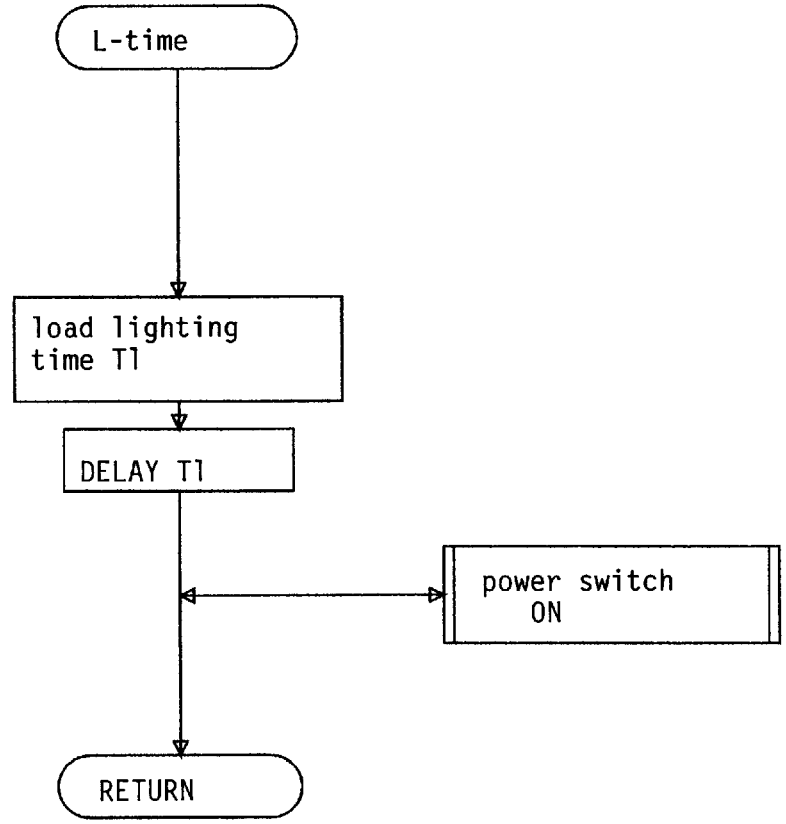
FIG. 4 is a flow chart for the limitation of lighting time.

FIG. 4 shows an example of a subroutine for reducing the brightness of the tubes by limiting the lighting time T1. This utilizes the fact that the arc voltage is fallen below considerably and the discharge therefore quenched by switching on the power switch owing to the discharge section which now bridges with low resistance. The fact that heating current continues flowing through the tube electrodes so reignition takes place in the next half period when the electrodes are adequately heated is beneficial to the service life of the tube.

Figure 5:
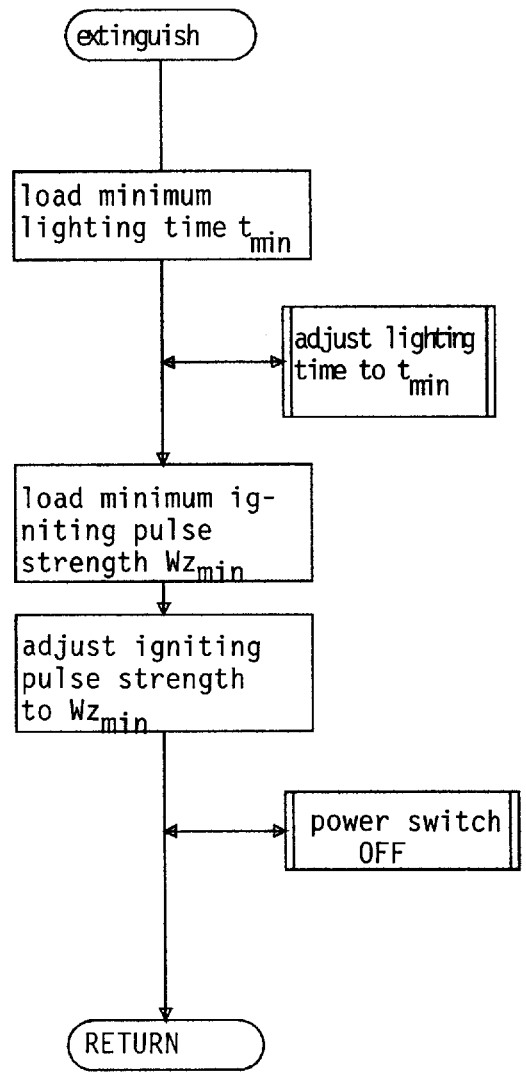
FIG. 5 is a flow chart for extinction of the discharge.

FIG. 5 shows a subroutine for extinguishing the discharge of a fluorescent tube in a lamp connected to the complete operating voltage. This utilises the fact that a fluorescent tube which is operated with minimum brightness adjustment quenches without increased igniting voltage. The tube is initially adjusted to minimum brightness, i.e. the lighting time adjusted to the lowest value tmin. The igniting pulse strength is now adjusted to its lowest value so the discharge quenches. The tube heater can also be disconnected if minimum igniting pulse strength is maintained.

The functions described hitherto are examples of basic functions of which a control program can be composed by the method according to the invention. It is possible to control even very complex procedures with high timing dynamics for a fluorescent tube as the emission of light can be varied for every half period of the a.c. operating voltage.

If control elements with a control program produced individually for each tube are now allocated to each tube of a lighting system and if the control programs take place synchronously with one another in the individual control elements, a multiprocessor controller with parallel processing is created with which even very complex and highly dynamic light and colour structures can be controlled for the entire system. For synchronisation, the a.c. operating voltage serves as a clock signal to which all lamps are connected in parallel. The program start is synchronized via the power on reset logic provided in every signal processor.

Other embodiments of the method are proposed, depending on the concrete application and object of a lighting system controlled according to the invention, to allow intervention in the sequence of programs in the individual control elements during operation. This is to be illustrated by a few examples.

With light sensors for detecting the environmental brightness, it is possible, for example, to produce lighting systems which adapt themselves automatically to the changing daylight without a central control device being necessary. Control which is more complex and which can allow, for example, for the time of day, season, day of the week, etc. is possible in addition to mere brightness control.

In addition to intervention via sensors into the programs in the control elements, the remote control of the program sequence in the individual control elements is proposed in a further embodiment of the method according to the invention. The control information is transmitted by a transducer to a signal receiver in the control element, and wireless methods of transmission such as ultrasound, light or high-frequency electromagnetic waves can also be used as well as those using a special signalling line for transmission. The transmission of signals via the supply line to which all lamps are connected is a further method of transmission.

An important criterion in the choice of the method of transmission used is the fact that a large number of control elements generally have to be equipped with a signal receiver in a lighting system according to the invention whereas the number of transducers used is small. To minimise the production costs of the control elements, it is therefore desirable to be able to design the signal receiver particularly simply. The transducers have to meet the requirement of being easily exchangeable for conventional light switches to allow easy conversion of an existing conventional lighting system to the control method according to the invention, and this represents one of the objects of the invention. This entails a method of transmission which must allow the transducer to be merely looped into one of the supply lines as the second pole of the supply voltage is not generally guided to the light switches. This is allowed for in an advantageous embodiment of the method according to the invention in which signal transmission via the supply system is adopted and in which no additional hardware components but merely an additional subroutine is required for receiving the signals in the individual control elements.

Figure 6:
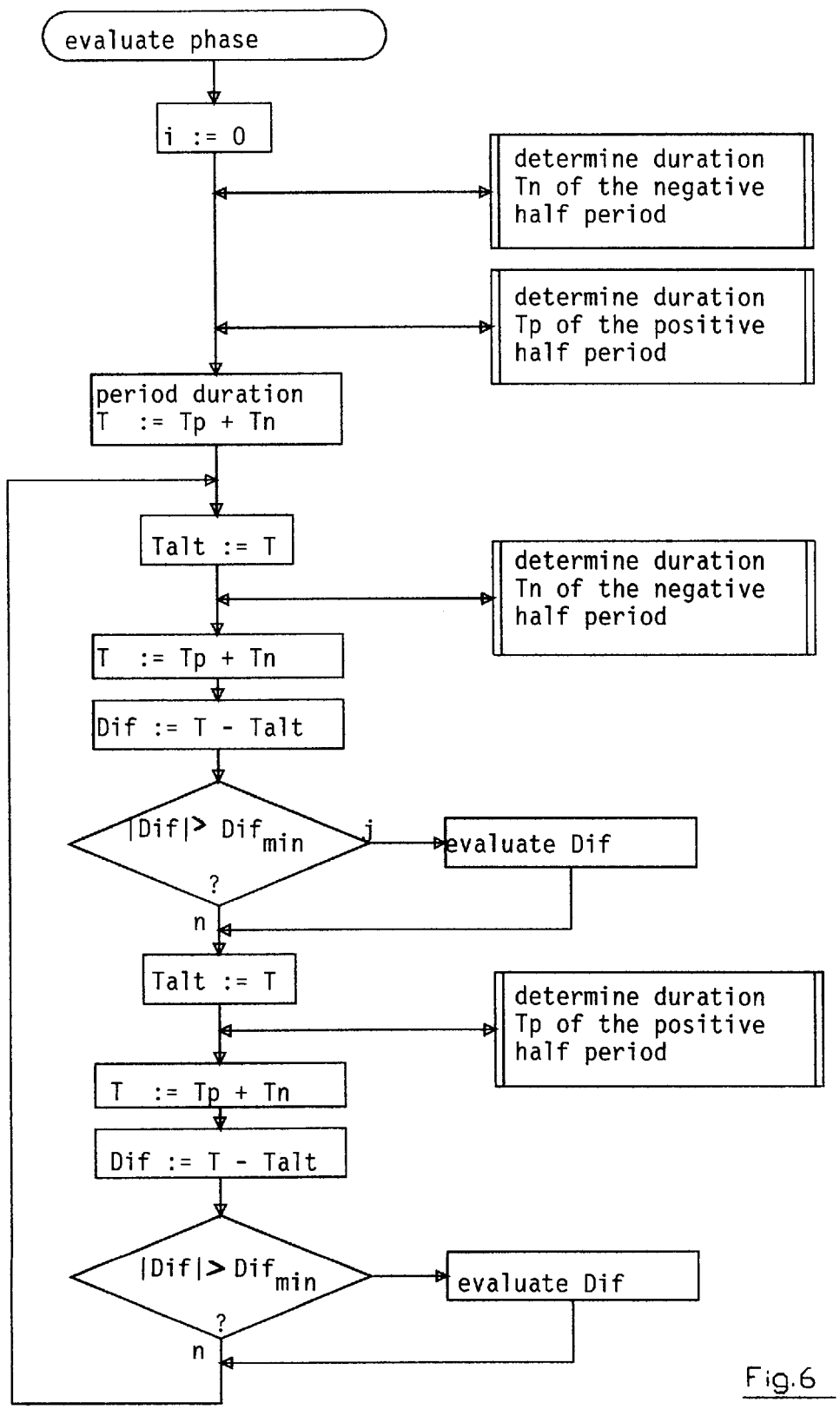
FIG. 6 is a flow chart for evaluating the control signals contained in the phase signal.

With the method of transmission used, the half periods of the a.c. supply voltage are influenced so as to produce an evaluatable displacement of the passages through zero of the voltages at the respective terminals St1 and St2 of the control elements 1 in the individual lamps of the lighting system. The resultant displacement of the edges of the phase detector signal is evaluated by a program loop running in the background of the control program of which FIG. 6 shows a simple example.

Figure 7:
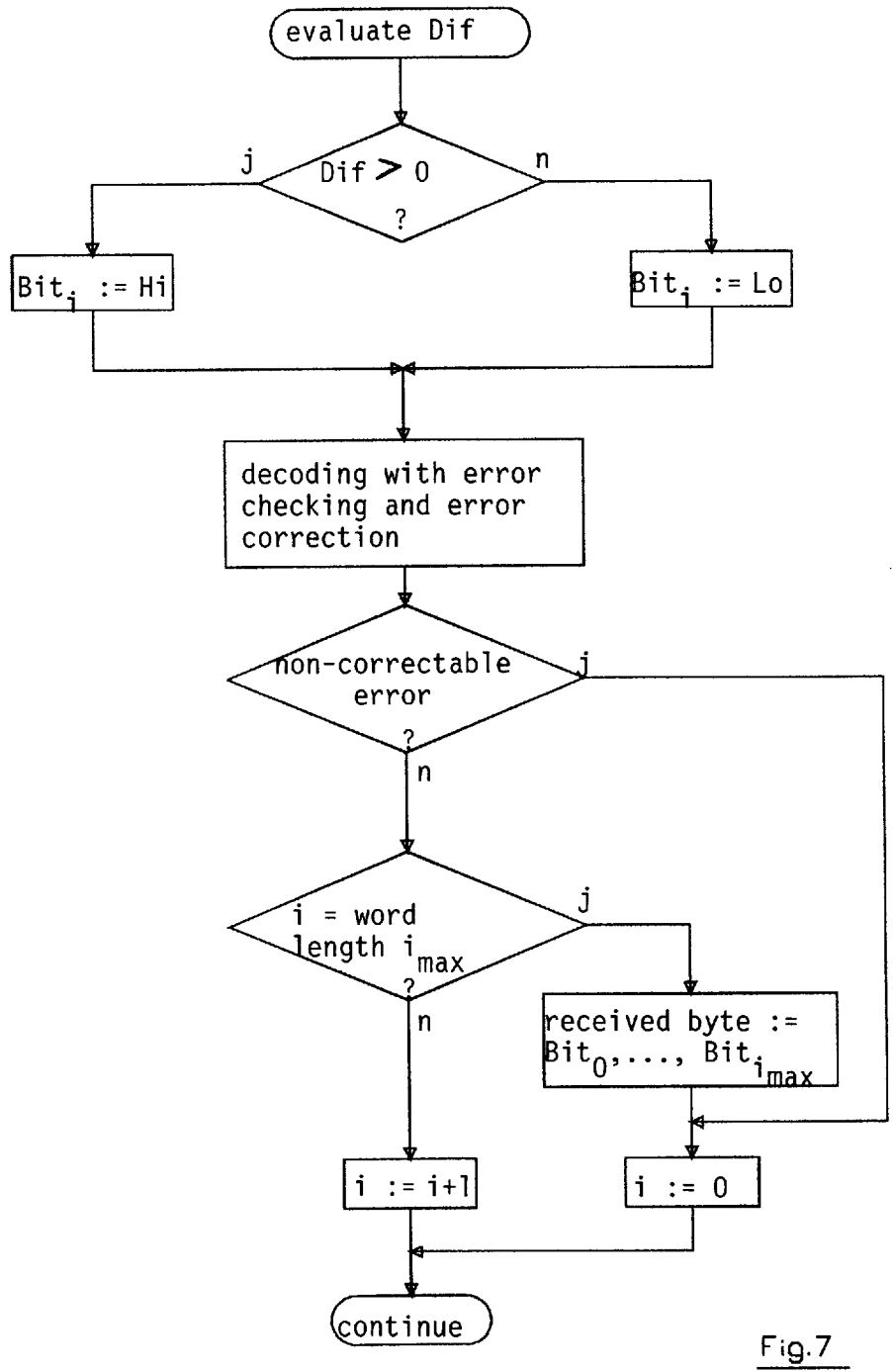
FIG. 7 is a flow chart for evaluating the phase difference from FIG. 13.

The respective duration Tn or Tp of the prevailing half period is determined and added to the value Tp or Tn of the preceding half period of opposing polarity. With the prevailing period duration T thus obtained and the period duration Talt similarly determined in the preceding half period, the phase shift Dif is obtained by subtraction. If the absolute value of the phase shift Dif exceeds a predetermined threshold value Difmin, the information contained in the phase shift is evaluated in a further program segment, of which FIG. 7 shows a simple example.

The logic level of the receiving $Bit_{13}$ i is initially determined by means of the sign of the phase shift. Decoding is then carried out in a known manner with error checking and error correction and, if there are no non-correctable errors, the receiving Bit_i is added to the receiving byte Bit_0, . . . , Bit_imax and the bit counter i incremented. This procedure is continued until the bit counter i indicates that all bits of the receiving byte have been transmitted without error, whereupon the bit counter i is reset for receiving a new byte. If an uncorrectable error is detected, the reception of the prevailing byte is interrupted by resetting the bit counter i.

Figure 10:
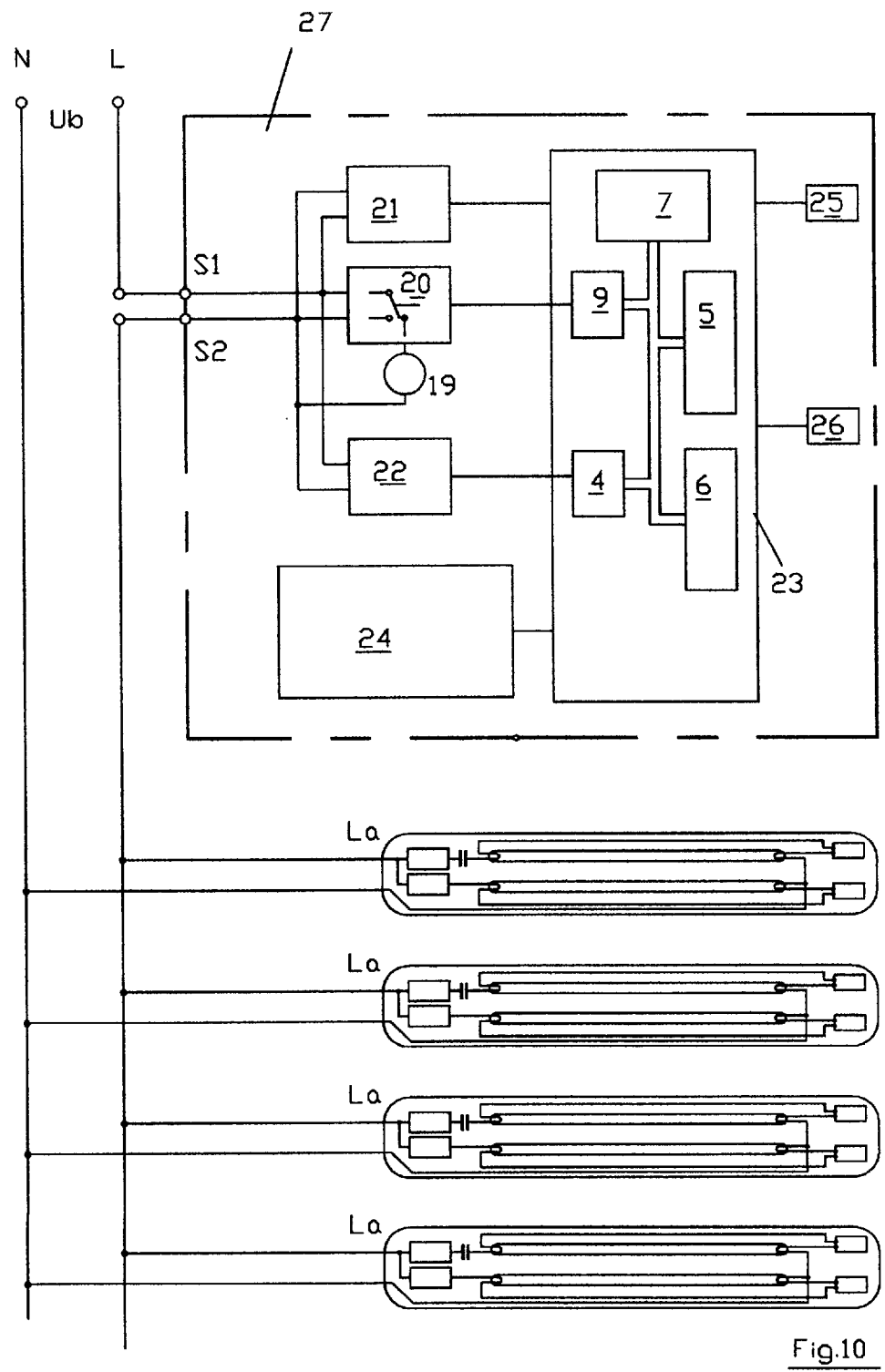
FIG. 10 is a block circuit diagram of a transducer which can be looped into the supply line.

FIG. 10 is a block circuit diagram of an example of a transducer 27 which can be looped into an A.c. supply line of a lighting system via the terminals S1 and S2 instead of a light switch. The fact is utilised that the energy of this half period converted in each ballast device is increased or reduced during a half period or part of a half period by a series connection of a voltage source 19 with identical or opposed polarity to the instantaneous polarity of the a.c. supply voltage, and this leads to a corresponding increase or reduction in the current flow time and therefore to a corresponding shift in the passage through zero by the current. The power switch 20 is a component of the transducer according to FIG. 10. In its first switch state it bridges the terminals S1 and S2 with low resistance and in its second switch state it connects them to the voltage source 19 which can essentially consist of a memory element such as a capacitor, a coil or an accumulator or of a semiconductor element such as a diode with voltage-dependent breakdown behaviour. The phase detector 22 which transforms the voltage at S1 and S2 into an in-phase rectangular signal with an amplitude suitable for further processing is a further component of the transducer 27. The signal processor 23 is a further component of the transducer 27. It can be a conventional commercial simple microprocessor or also a simple integrated circuit specific to the customer, the arrangement of the functional blocks corresponding to that of the signal processor 3 in the control element 1. The unit 25 is used to produce the system clock for the signal processor 23 and the unit 21 for the power supply. The unit 24 is a further component. It represents a keypad for operation of the transducer and can additionally also contain a display panel for feedback. An additional interface connection 26 can additionally be provided in a known manner.

Figure 11:
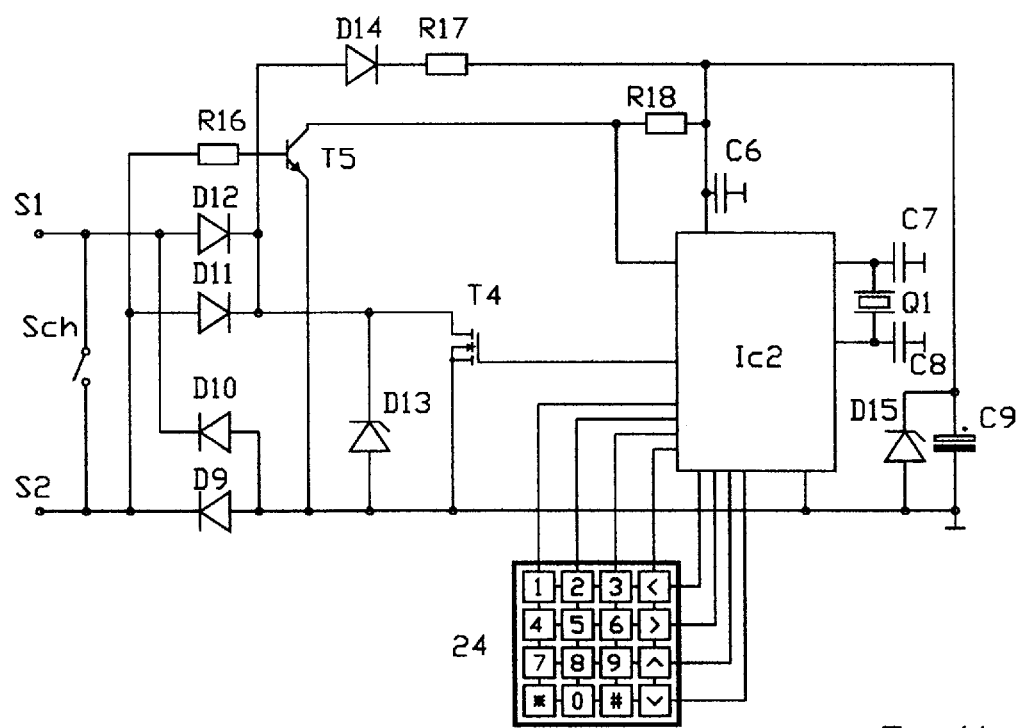
FIG. 11 is a circuit diagram of an embodiment of a simple transducer.

FIG. 11 shows an example of a simple embodiment of a transducer for the method according to the invention using a conventional commercial microprocessor Ic2. The voltage at S1 and S2 which is connected in series with the operating voltage Ub can be switched over between the low passage voltage of the diodes D9 and D12 or D10 and D11 and the breakdown voltage of the power Zener diode D13 by the MOS-FET power transistor T4. When the power switch T4 is switched on, roughly the a.c. operating voltage Ub is therefore applied to the lamps La but when the power switch is switched off, roughly the operating voltage reduced by the breakdown voltage of D13. Unnecessary losses and associated heating are avoided by closing a mechanical switch Sch in the operating pauses of the transducer.

The transistor T5 forms with the resistors R16 and R18 the phase detector for the a.c. voltage applied to S1 and S2. Owing to the low current consumption of the module Ic2 of CMOS design, the voltage supply is very simple in construction. The capacitor C9 is loaded via the diode D14 and the resistor R17 during the blocking phase of T4, its voltage being limited to the operating voltage permitted for Ic2 by the Zener diode D15. While T4 conducts, D14 prevents the capacitor charge from flowing from C9. C7 and C8 together with the resonator Q1 serve for clock generation for Ic2 in a known manner.

The control software deposited in the non-volatile memory 5 of the signal processor 23 is responsible for operation of the transducer 27. In addition to the known routines not described in detail here for communication with the user via a keypad 24 and/or via the optionally provided interface connection 26, it consists of a routine according to FIG. 12 for the transmission of a data byte Bit0, . . . Bitimax. For the transmission of information, one of the two voltages U0 or U1 is added to the a.c. operating voltage or subtracted from it for the duration tp according to its sign after each phase reversal after a delay time tv. This procedure is designated by "generate 1 pulse" or "generate 0 pulse" in the flow chart in FIG. 12.

Figure 12:
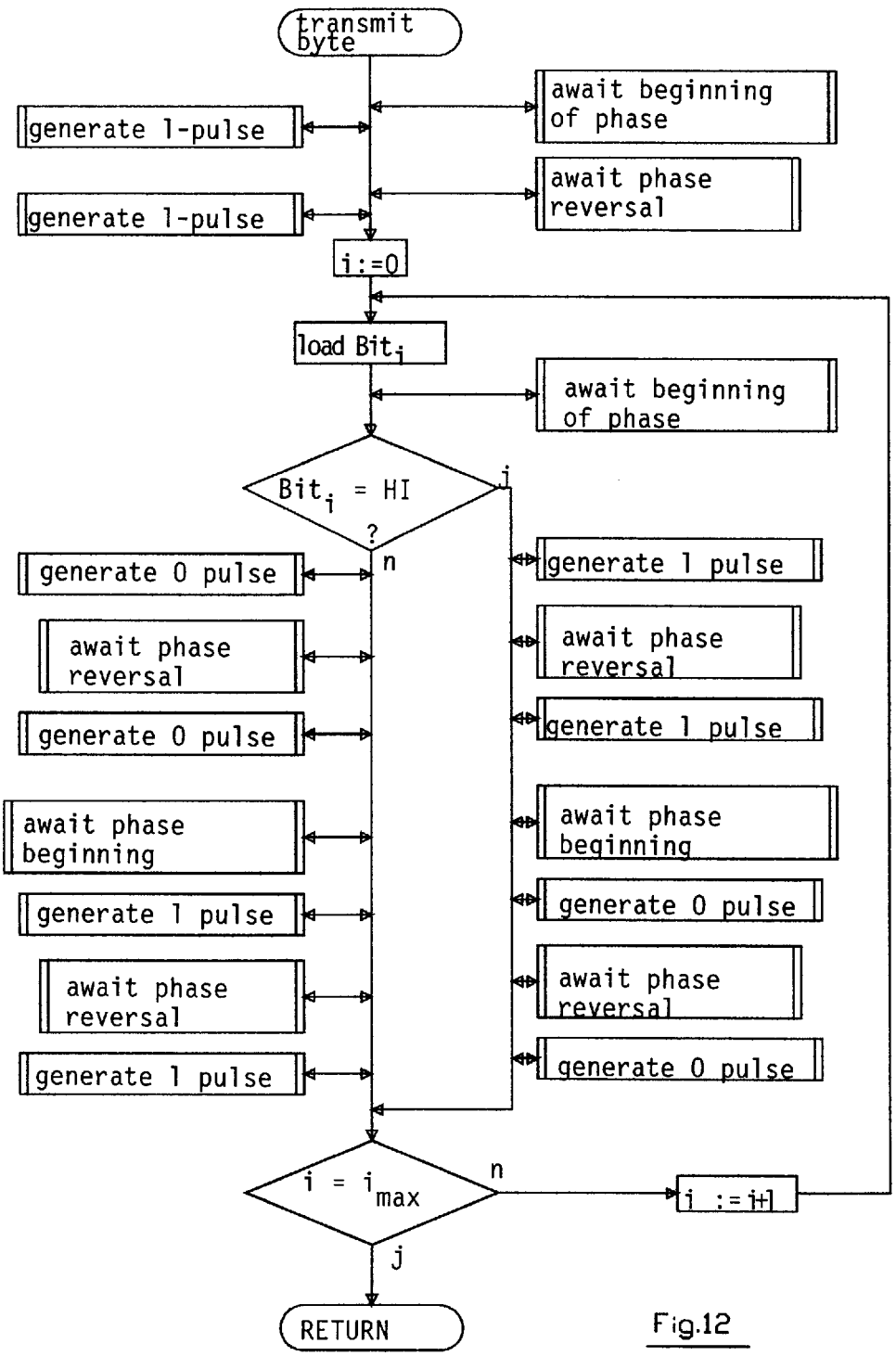
FIG. 12 is a flow chart for the transmission of a byte of information.

FIG. 12 shows a simple example of the transmission of a transmission byte Bit0, . . . Bit_i_max which is first initiated with the production of a U1-pulse for the two half periods of a period. The individual Bit_i are then transmitted in that a U0-pulse is produced in each case for each LO bit for the two half periods of a period and a U1-pulse in each case for the two half periods of the next period. A HI bit is accordingly transmitted by two U1-pulses followed by two U0-pulses. In addition to that used in the example, many other known methods of coding can be employed.

To avoid transmission errors due to disturbances which are transmitted onto the supply system of the lighting system from outside, it is also possible, in addition to the use of special filter circuits, to evaluate the signal of the phase detector in the transducer itself using a software routine according to FIG. 6 and FIG. 7 and to emit additional information for error correction in a known manner if an error occurs.

Furthermore, information from other transducers which are used in the same lighting system can also be received and evaluated via the phase detector in the transducer. It is similarly possible to receive and evaluate signals produced by a control element 1. In the same manner as with the transducer, a change in the energy converted in a ballast device during a half period leads to a phase shift which can be measured by the phase detector 22 of the transducer 27 and can be evaluated in the signal processor 23. This change in the converted energy is brought about by changing the lighting time for a half wave. This allows, for example, the operability of a lamp to be monitored in that the control element 1 in this lamp is caused by a control command of the transducer 27 to make a specific switching sequence which characteristically acts on the output signal of the phase detector in the control element and can therefore be evaluated.

If appropriate transmission protocols are employed, a data flow in any direction is possible with a lighting system according to the invention, and each transducer and each control element can be caused to respond via an individual address. In addition to the control and monitoring functions, data transmission also serves permanently to store operating parameters in the non-volatile memory of the signal processor and, if an electrically extinguishable non-volatile memory is provided for this purpose, also to change them. This allows a lighting system according to the invention to be adapted to frequently changing requirements and allows the new adjusted values to be stored permanently so they are immediately available each time the system is switched on again.

The use of electrically extinguishable non-volatile memories also allows the control programs in the individual control elements to be reprogrammed by each transducer. This allows new control programs for new light and colour patterns to be transmitted at any time into the individual control elements of a lighting system.

It is also proposed that, for the transmission of larger quantities of data in a shorter time, a programming device be connected instead of the a.c. operating voltage, the programming device utilising a frequency which is substantially higher than the mains frequency and simultaneously producing the phase modulation required for data transmission. It also receives the data via an interface from the external computer used for program development. By frequency measurement at the start of the control program in each control element 1, it is possible to switch over automatically on recognition of the high frequency into a particular programming state which prevents a start of the lamp and thus allows rapid programming with larger quantities of data. If the normal a.c. operating voltage is then applied again, the system starts again with normal operation.

What is claimed is:

1. A method of controlling fluorescent lamps of a lighting system operated by the a.c. power supply, each lamp consisting of a series circuit comprising an impedance (13) for current limitation with a fluorescent tube (12) with preheatable electrodes and a control element (1) with an electronic power switch (2) comprising an arithmetic and logic unit (7) for the functions of heating and igniting pulse production with isolation of the discharge section, wherein the control element (1) additionally has a signal processor (3), which is provided with digital input unit (4), non-volatile memory (5), random access memory (6), clock generation means (8) and digital output unit (9), and a phase detector (10) and a power supply unit (11), the control signals for the power switch for the modes of operation starting or dimming or extinction or feedback being produced by means of a control program deposited in the non-volatile memory and from phase information of the phase detector, and the control element (1) being arranged in the heating circuit of the fluorescent tube (12).

2. A method according to claim 1, wherein the control element additionally has an adaptation element (14) for the voltage applied to the connections of the control element and an adaptation element (15) for the current strength flowing through the connections of the control element and wherein the signal processor has an additional analogue input and an analogue to digital converter (16) by means of which the adapted voltage and current strength value can be made available to the control program.

3. A method according to claim 1, wherein the control element additionally has sensors (17) for detecting environmental parameters such as the ambient temperature or the atmospheric humidity or the brightness or colour of the environmental light or of pollutants or the presence or movement of a body with the respective corresponding adaptation circuit (18), and the signal processor has corresponding analogue inputs and associated analogue digital converters or digital inputs by means of which the value of the respective environmental parameter can be made available to the control program.

4. A method according to claim 1, wherein the control program has a subroutine for tube types with an increased igniting voltage requirement for extinguishing the discharge, the lighting time being adjusted to a minimum value in a first stage, the igniting pulse strength being adjusted to a minimum value in a second stage so the discharge quenches and the heating being switched off in a third stage with minimum igniting pulse strength.

5. A method according to claim 1, wherein the sequence of the control program in the individual control elements can be influenced by signal transmission from one or more transducers to these control elements, the transducers activating, by emitting an address, the control element or the group of control elements allocated to this address for receiving and evaluating the subsequently transmitted command.

6. A method according to claim 5, wherein signal transmission takes place via the power supply line to which the lamps are connected, at least one transducer connected to the line for transmitting a unit of information changing the voltage trend of at least one half period of the a.c. supply voltage such that this change leads to a corresponding displacement of the edges of the signal of the phase detector

(10) in the control element (1) and wherein the control program in the control element (1) has a subroutine for evaluating the information contained in the signal of the phase detector.

7. A method according to claim 6, wherein at least one transducer is looped instead of the light switch into a supply line of the lighting system or a part of the supply line which then changes the voltage trend of at least one half period of the a.c. supply voltage for transmitting an information unit, wherein, via its terminals (S1, S2), a power switch (20) connects in series a power source (19) identically or opposingly directed to the instantaneous polarity for pails of the half period or the entire half period, a signal processor (23) supplied by the voltage supply unit (21) generating the control signals for the power switch (20) from the signal of the phase detector (22) which signals the beginning and the polarity of a half period and the data of a keypad (24) and/or of an optional interface connection (26) by means of a control program.

8. A method according to claim 6, wherein the control element (1) acts as a transducer and, for transmitting an information unit via the supply line, changes the lighting time for one or more half periods, which also leads to a correspondingly evaluatable displacement of the signal edges of the phase detector signals.

9. A method according to claim 1, wherein at least a portion of the non-volatile memory (5) in the signal processors (1, 27) consists of an electrically extinguishable programmable memory (EEPROM) for picking up and changing operating parameters and control programs to allow adaptation of a lighting system to changing requirements without having to exchange the control elements.

10. A method according to claim 9, wherein, for changing the parameters and/or the programs, data transmission is carried out via the supply line with a programming voltage source having a substantially higher frequency and wherein, on detecting this high frequency, the control elements automatically branch into a programming routine in which no lamp start occurs.

\* \* \* \* \*